(12) United States Patent
Dorrington (10) Patent No.: US 7,391,505 B2
(45) Date of Patent: Jun. 24, 2008

(54) RANGE SENSING SYSTEM

(75) Inventor: Adrian Andrew Dorrington, Hamilton (NZ)

(73) Assignee: The University of Waikato, Hamilton (NZ)

( * ) Notice: Subject to any disclaimer, the term of this patent is extended or adjusted under 35 U.S.C. 154(b) by 0 days.

(21) Appl. No.: 10/552,334

(22) PCT Filed: Apr. 6, 2004

(86) PCT No.: PCT/NZ2004/000070

§ 371 (c)(1),
(2), (4) Date: May 24, 2006

(87) PCT Pub. No.: WO2004/090568

PCT Pub. Date: Oct. 21, 2004

(65) Prior Publication Data

US 2007/0171395 A1     Jul. 26, 2007

(30) Foreign Application Priority Data

Apr. 8, 2003     (NZ) ...................................... 525241

(51) Int. Cl.
*G01C 3/08* (2006.01)
(52) U.S. Cl. ................ 356/5.09; 356/5.1; 342/127; 367/99; 367/123
(58) Field of Classification Search ................ 356/5.09
See application file for complete search history.

(56) References Cited

U.S. PATENT DOCUMENTS

| | | | |
|---|---|---|---|
| 3,992,615 A | 11/1976 | Bennet et al. | |
| 4,552,454 A * | 11/1985 | Glaser et al. | 356/4.02 |
| 4,560,271 A | 12/1985 | Kumio | |
| 6,137,438 A | 10/2000 | McEwan | |
| 6,369,880 B1 * | 4/2002 | Steinlechner | 356/5.11 |
| 6,507,706 B1 | 1/2003 | Brazas et al. | |
| 7,202,941 B2 * | 4/2007 | Munro | 356/5.01 |
| 2001/0039740 A1 * | 11/2001 | Kaneko et al. | 33/290 |
| 2003/0063775 A1 * | 4/2003 | Rafii et al. | 382/106 |
| 2003/0146986 A1 * | 8/2003 | Calderwood | 348/240.1 |
| 2003/0223053 A1 * | 12/2003 | Liu et al. | 356/5.1 |

* cited by examiner

*Primary Examiner*—Thomas H. Tarcza
*Assistant Examiner*—Timothy A Brainard
(74) *Attorney, Agent, or Firm*—Sheridan Ross PC (57) ABSTRACT

The invention relates to a solid-state range sensing system. As with previous solid-state range sensing systems, an energy source is activated and deactivated in a cyclic pattern with a selected source frequency. A receiver is adapted to sense the reflection of emitted energy from the target. The receiver includes a shielding system to block the sensing of the reflected energy from the target in a cyclic pattern with a selected receiver frequency. Unlike the prior art, the frequency of the source and receiver are offset by a small frequency. The resulting output signal of the receiver is a further cyclic pattern beat signal of frequency equal to the difference between the source activation and receiver shielding modulation frequencies. The best signal is effectively a down-converted version of the source modulation frequency and, unlike the prior art, is compared with a reference beat signal whereby the phase difference between the two beat signals is used to determine a range value. The use of beat signals provides higher precision than the prior art.

20 Claims, 4 Drawing Sheets

RANGE SENSING SYSTEM

TECHNICAL FIELD

This invention relates to a range sensing system. Preferably the present invention may provide an input system for machine vision applications whereby machinery or robotics are given feedback on an environment. However, applications outside of machine vision that are also envisioned and reference to the above only throughout this specification should in no way be seen as limiting.

BACKGROUND ART

Simple range sensing systems which can quickly determine the range to one target or point are well known. These systems can be used in many applications, from determining a golfer's distance to the hole they are playing, to surveying applications to calculate the distance between specific landmarks or points.

These systems normally employ a laser range finding system where a laser beam is trained onto a selected target, and a receiver associated with the system calculates a distance or range to the target through the propagation delay of the laser beam.

However, these systems cannot necessarily be used easily where the range to multiple targets needs to be calculated simultaneously or in a very short period of time. For example, these types of "single target" range finders cannot necessarily be used effectively in machine vision applications which employ range information for all targets with a scene as inputs to object identification algorithms.

One attempt to provide a range finding system for such applications can employ a laser range finder substantially as described above, which has the laser beam scanned over the region of interest and all targets within such a region. However, this approach is not ideal as mechanical systems are required to physically move the laser source to provide the scanning motion required. Furthermore, significant computation or processing power is also required to calculate the range of a number of discreet targets using the propagation delay associated with multiple scans of the laser beam. Range information must be calculated separately for each scanning movement of the laser, which will require high performance computer processing power to ensure that the range information can be provided at an effective or useful speed.

A discussion on scanned laser systems above can be found in U.S. Pat. No. 5,638,164 and in D. Tu, "Range Image Acquisition for Machine Vision", Optical Engineering, 37(9), pp 2531-5, 1998.

Another alternative range sensing system has also been developed to address these problems associated with scanned laser range finding systems, and is discussed in U.S. Pat. No. 6,100,517. This system employs a light or energy source and associated light or energy sensor both of which are pulsed on and off at the same frequency. Energy from the pulsed source is reflected from the targets within a particular area or region back towards the energy sensor, which again is enabled or activated in a pulse manner so that this reflected light will only be sensed when the sensor is activated.

The selective activation of the sensor is implemented through a shutter or gate placed between the sensor and any targets within a scene, and this shutter is open and closed at the correct pulsing frequency required. The frequency at which the source and sensor are pulsed is selected so that the amount of light reflected from distant targets is cut off after a set propagation delay, as opposed to light reflected from near targets which has a lower propagation delay. Light will be received from near objects for a longer period of time than light reflected or scattered from more distant objects. Therefore, more light will be received from near targets than distant targets, which gives a light intensity value or reading for a target which is proportional to its range from the sensor.

This type of system can be implemented with relatively low cost components and does not require the level of computational processing power which the scanned laser range finder discussed above requires. However, there are additional variables present in the operating environment of the system which can cause inaccuracies or errors in the resultant data obtained.

Changes in ambient light level (and therefore the amount of light received by the sensor) will provide an offset error in the results obtained. Furthermore, targets within a particular scene which have relatively high or low reflectance properties will also create errors in the output obtained, as the amount of light received by the sensor will vary not just with the range of the target from the sensor. Such systems that derive range values from intensity information are also ultimately limited in range resolution by the dynamic range of the sensor employed. If a low cost or low quality sensor, then the performance or accuracy of the range value derived in turn suffers.

An improved range sensing system which addressed any or all of the above problems would be of advantage. Specifically a range sensing system which could be implemented using relatively low cost componentry, which did not require a high degree of computational processing power and which also did not suffer from inaccuracies due to changing ambient light levels nor variable reflectance properties of targets would be of advantage.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a range sensing system which includes, at least one energy source adapted to emit energy capable of reflection by one or more targets within a region, and at least one receiver adapted to sense the reflection of emitted energy from said at least one target within said region, and an activation system associated with said at least one energy source, said activation system being adapted to activate and deactivate an energy source in a cyclic pattern with a selected source frequency, and a shielding system associated with said at least one receiver, said shielding system being adapted to block the sensing of reflected energy from a target by a receiver, said shielding system being activated and deactivated in a cyclic pattern with a selected receiver frequency, wherein an output signal of a receiver is compared with a reference signal to determine a range value for a target from the receiver, with phase differences between the receiver signal and reference signal indicating a range value.

According to a further aspect of the present invention there is provided a range sensing system substantially as described above wherein said source frequency and receiver frequencies are selected from different frequency values.

According to yet another aspect of the present invention there is provided a range sensing system substantially as described above wherein a processing means is used to compare an output signal of a receiver to a reference signal to determine a range value for a target from the receiver.

According to a further aspect of the present invention there is provided a range sensing system substantially as described above wherein the source frequency used is phase locked with respect to the receiver frequency used.

According to yet another aspect of the present invention there is provided a range sensing system substantially as described above which is adapted to use a number of paired source and receiver frequencies to vary the distance over which range values can be indicated.

According to a further aspect of the present invention there is provided a range sensing system substantially as described above wherein said at least one energy source is activated and said at least one receiver is shielded using a plurality of paired source and receiver frequencies.

According to a further aspect of the present invention there is provided a range sensing system substantially as described above wherein the receiver is adapted to emit and generate a plurality of output signals in response to the use of a plurality of paired sets of source and receiver frequencies.

According to yet another aspect of the present invention there is provided a method of calculating a range to a target within a region, characterised by the steps of;
(i) activating an energy source using an activation system, said energy source being activated and deactivated in a cyclic pattern with a selected source frequency, and
(ii) operating a receiver using a shielding system, said shielding system being adapted to block the sensing of reflected energy from a target in a cyclic pattern with a selected receiver frequency, and
(iii) comparing a receiver output signal with a reference signal to determine a range value for said target, where phase differences between the receiver output signal and reference signal indicate said range value.

According to a further aspect of the present invention there is provided a method of calculating a range to a target substantially as described above wherein the energy source is activated and receiver is shielded using a plurality of paired source and receiver frequencies.

The present invention is preferably adapted to provide a range sensing system which can simultaneously or in a short period of time provide range values for a plurality of targets within a selected region. In a further preferred embodiment the present invention may be used in machine vision applications where such range information from a plurality of targets can be used in object identification algorithms.

Reference throughout this specification will also be made to the present invention being used as a range sensing system, which is preferably employed in a machine vision application. However, those skilled in the art should appreciate that other configurations of the present invention are envisioned and reference to the above only throughout this specification should in no way be seen as limiting.

Furthermore, reference throughout this specification will also be made to the present invention being used to provide range values or indications for a plurality of targets within a region simultaneously. Those skilled in the art should also appreciate that some propagation or processing delay may also be present in the provision of such values due to technical limitations of the equipment used. The term simultaneously referred to throughout this specification refers to events occurring substantially at the same time.

Preferably the present invention employs at least one energy source which is adapted to emit a form of energy which can be reflected or scattered from targets within a selected region. The energy source employed can emit any number of different spectra or energies with variable frequencies depending on the particular application which the present invention is to be employed. Furthermore, the energy emitted from a source may be substantially diffused in some embodiments or alternatively focused into a cohesive beam in other embodiments if required.

In a further preferred embodiment the present invention may include a single energy source only which has a substantially diffuse emission pattern for the energy that it generates or emits. Such a single energy source can be used to expose an entire region of interest to energy capable of reflection by targets.

In a further preferred embodiment the energy source employed may emit energy from the visible light spectra. Visible light energy emitters are well known and also inexpensive to produce or obtain. Furthermore, a visible light energy source such as for example, a common light emitting diode, or LED can also be easily configured and operated to illuminate the region of interest.

Reference throughout this specification will also be made to the present invention employing a single visible light energy source in the form of a LED which radiates a diffused pattern of visible light. However, those skilled in the art should appreciate that other configurations or numbers of energy sources which can emit different spectra or frequencies of energy may also be employed in conjunction with the present invention if required.

In a preferred embodiment the present invention also includes at least one receiver adapted to sense the reflection of emitted energy from said at least one target within a region of interest. Those skilled in the art should appreciate that the type of receiver employed will be determined by the spectra or frequency of the energy emitted by the energy source used. For example, in a further preferred embodiment where a light emitting diode (LED) or other forms of visible light emitters are used as an energy source, a visible light responsive transducer or sensor may be employed in conjunction with the present invention.

Other light sensors can include CMOS cameras, Vidicon tubes, photodiode arrays and photomultiplier arrays.

In a further preferred embodiment the present invention may employ a single receiver only. A single receiver may be configured to provide adequate coverage of the region of interest thereby substantially simplifying the design of the system provided and also reducing its manufacturing cost.

In a preferred embodiment a receiver used may be provided through some form of charge couple device (CCD) such as for example, a CCD camera well known in the art. Such devices or cameras have many varied uses and are produced in large numbers at relatively low cost. Furthermore, a CCD camera can also provide effective coverage for a large or wide region of interest through sensing the reflection of visible light from targets within such a region.

Reference throughout this specification will also be made to the present invention employing a single CCD camera only as a receiver of reflected energy. However, those skilled in the art should appreciate that other configurations of the present invention which employ different types and numbers of receivers are also envisioned, and reference to the above only throughout this specification should in no way be seen as limiting.

In a preferred embodiment the present invention also employs an activation system. Such an activation system can be associated with the energy source to activate and deactivate the source with the cyclic pattern. The activation system can be configured to pulse the energy or light source on and off with a particular regular source frequency.

An activation system as discussed above may be implemented in many different ways depending on the particular application for the present invention. For example, in one instance the activation system may simply consist of a power supply for an energy source where the source frequency employed is used to enable and disable the supply of power to an energy source at the source frequency. However, those skilled in the art should appreciate that other implementations of an activation system are envisioned and reference to the above only throughout this specification should in no way be seen as limiting.

Preferably the present invention may also include a shielding system which is associated with the receiver employed. Such a shielding system can be operated to block the receiver sensing light reflected by targets within a region of interest.

The shielding system may be activated and deactivated with a cyclic pattern to in turn block or enable the sensing of reflected light with a cyclic pattern. The shielding system and therefore in effect the receiver can be operated at a selected receiver frequency, therefore to provide a cyclic effect to the output obtained from the receiver.

A shielding system used in conjunction with the present invention may be implemented in a number of different ways. For example, in one possible embodiment a physical barrier such as a gate or shutter may be placed in front of a receiver with the shutter being opened and closed at the selected receiver frequency. Alternatively, in other embodiments the shielding system may be implemented with the components also employed to provide a receiver. In such instances a shielding system may be implemented through an enable signal applied to operate a receiver. For example, where a CCD camera is employed as a receiver such a shielding system may be implemented through control electronics also incorporated into the camera which enable and subsequently disable the sensing of light at the particular receiver frequency selected.

Reference throughout this specification will also be made to a shielding system being formed from a shuttering or gating element which is pulsed open and closed at the receiver frequency employed. However, those skilled in the art should appreciate that other configurations of the present invention are envisioned and reference to the above only throughout this specification should in no way be seen as limiting.

In a preferred embodiment the source and receiver frequencies employed may be selected from different frequencies. These frequencies may preferably be slightly offset from one another with the size of the frequency difference being approximately equal to the operating frequencies employed by a relatively low cost signal processing and imaging acquisition equipment.

Those skilled in the art should also appreciate that many different types of wave form or wave functions with selected frequencies may be used to provide either or both the source frequency and receiver frequency. The selected frequency signals used to drive the activation and shielding systems can be formed from for example, pulsed square waves, triangular waves, sinusoidal waves or any other required type of wave function which exhibits the correct frequency required.

In a further preferred embodiment both the activation system and shielding system may be driven by receiver and source frequencies generated by a single signal generator. In a further preferred embodiment the signal generator employed can generate a receiver frequency which is phase locked with respect to the source frequency generated by the same equipment.

In a preferred embodiment the receiver employed is adapted to provide at least one receiver output signal which is analysed to determine the range values or indications required from the present invention. Due to the wave mixing effects provided through driving the receiver and source at slightly offset frequencies, a resultant receiver output signal can be obtained with a frequency equal to the frequency difference between the driving receiver and source frequencies. This output signal, which can have a substantially lower frequency than the source or receiver frequencies, can therefore be analysed and manipulated easily by relatively low cost signal processing and imaging acquisition components.

In this way the present invention can provide an optical or image heterodyning system which allows the signal processing equipment employed to function at relatively low frequencies when compared with the receiver and source frequencies. The optical mixing effects employed can be used to downshift the resultant frequency of interest to a lower frequency which can be easily analysed or manipulated.

In a further preferred embodiment, a receiver may be adapted to generate or provide a plurality of discrete receiver output signals over a time period in which a plurality of paired sets of source and receiver frequencies are used to simultaneously drive at least one energy source and shielding system employed in conjunction with the present invention. Each paired set of source and receiver frequencies can in turn generate an associated receiver output signal. Furthermore, in the case where a charged coupled device is employed as a receiver, such a receiver may make available a plurality of receiver output signals simultaneously for each "pixel" used to make up an image of the scene under observation.

In a preferred embodiment an output signal from a receiver is compared to a reference signal to provide an indication of a range value for a particular target within a region. The output signal obtained from the receiver may be generated from light reflected by a particular target, and in most instances would be represented by pixels generated through use of a CCD camera as a receiver. A single target or object within a particular region may therefore be represented by multiple pixels, with each pixel indicating range information for component portions of a target.

The reference signal to which the comparison is made can be obtained through a calibration procedure whereby the reference signal is equal to an output signal where the range of the target from the receiver is known. A calibration procedure can be employed in some instances to obtain one or more reference signals which are compared to a receiver output signal to indicate a range value.

However, in an alternative embodiment a reference signal may not necessarily be obtained through a separate calibration procedure. For example, in another alternative embodiment a reference signal may be obtained through the mixing together of the receiver frequency and source frequency. This will allow a resultant reference signal to be obtained of the order of the difference between the receiver and source frequencies, which will represent a signal which would be obtained from a target with a zero distance from the receiver.

In a further preferred embodiment the phase differences between a receiver output signal and the reference signal employed may indicate a range value for the target involved to the receiver. The extent of the phase difference between these two signals will indicate the displacement of the target from the particular range value represented by the reference signal. Those skilled in the art should appreciate that this is only one possible measurement scheme, and other well known schemes as such, but not limited to, continue as wave frequency modulation and pseudo random coding, may be adapted for operation with the present invention if required.

In a preferred embodiment the comparison made between a reference signal and an output signal from a receiver can be completed through use of a processing means. Such a processing means may preferably be implemented through any one of a number of types of signal processing components which are capable of receiving the input signals required and assessing phase differences between same. In a further preferred embodiment a computer system may be employed to complete the processing work required to give range values or indications from the input signals it received. Such a computer system may also provide numerical range values for each pixel of information obtained from the region of interest, where this matrix or array of numerical data can then be further processed or used in the application required for the present invention.

This implementation of the present invention eliminates complications known in existing prior art systems caused by changes in ambient light levels or varying reflectance properties of targets within a region. As phase differences between a reference signal and an output signal of a receiver are employed to indicate range, this eliminates errors in the output of the system caused by variations in light intensity values still received. The phase comparison resolution, and hence the measured range resolution, is ultimately limited by the length of time sequence being analysed, assuming that there is a detectable level of signal. Furthermore, the mixing effect employed through using slightly offset receiver and source frequencies allows the componentry or equipment used to make such a phase comparison to operate at relatively low frequencies, and therefore be provided through relatively low cost components.

In a further preferred embodiment the activation system and shielding system may be driven by a number of paired sets of receiver and source frequencies. Selected pairings of receiver and source frequencies can be used to drive these components to in turn vary the distances over which the present invention can accurately determine range values.

As phase differences are employed to calculate range values a single selected pair of receiver and source frequencies will provide useful information only for a selected maximum range. Outside of this range the phase differences between the resulting output signal and reference signal may encompass more than one cycle, and therefore make it difficult to determine a specific range value. However, by operating the system to employ two or more paired sets of source and receiver frequencies the present invention may be operated to investigate a number of maximum range values for a particular region, thereby improving the flexibility and also the capacity of the system provided. In a further preferred embodiment, these two or more paired sets of source and receiver frequencies use to extend the maximum range can be used simultaneously during only one measurement period when the frequency differences of each set of source and receiver frequencies are not the same. This allows each frequency difference to be processed independently during or just after a single measurement period to in turn provide information simultaneously on a wide number of potential range values.

The present invention provides many potential advantages over the prior art range sensing system.

The present invention can be used to provide a range sensing system which can operate quickly and effectively using the relatively low cost componentry. Such an implementation of a range sensing system may be used to provide an effective and useful system for machine vision applications.

Through sensing or determining range values by investigating the phase of a receiver output signal, the present invention also eliminates the complications normally present in the existing prior art systems caused by variable target reflectances or changes in ambient light levels in a region of interest.

Furthermore, the implementation of the present invention discussed above also allows relatively low cost signal processing equipment to be used to analyse the result of the output signal obtained, thereby substantially reducing the costs involved with implementing such a system.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
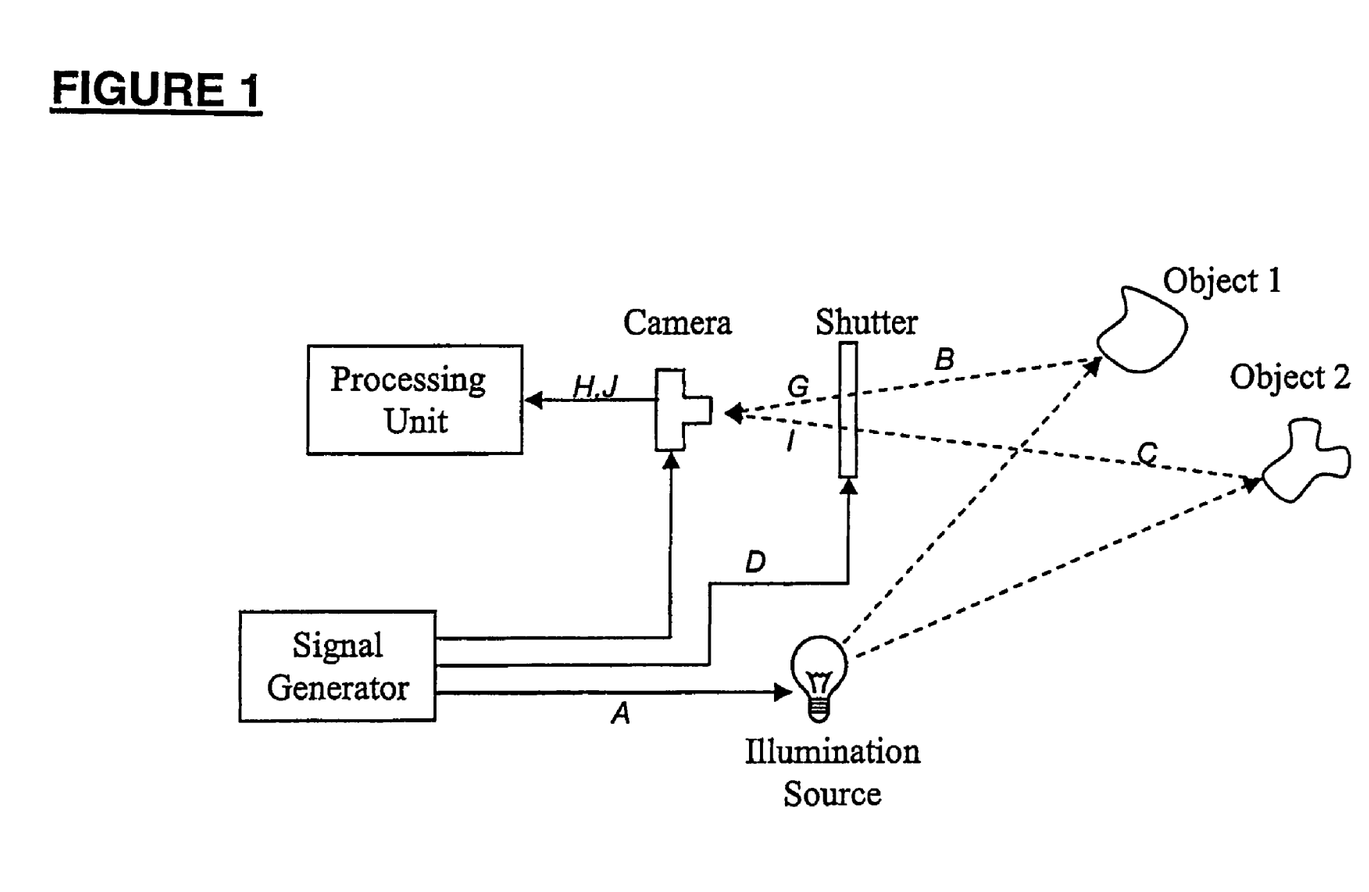
FIG. 1 shows a schematic view of components employed to provide a range sensing system in conjunction with a preferred embodiment of the present invention.

FIG. 1 illustrates a schematic view of components employed to provide a range sensing system in accordance with a preferred embodiment of the present invention.

FIG. 1 shows a range sensing system which incorporates a single energy source, shown in this embodiment as a single LED (2). The system (1) also includes a single receiver, shown in this embodiment as a charge coupled device camera (3).

The system (1) also incorporates an activation system, shown in this embodiment as a signal generator (4). The signal generator 4 is adapted to provide a driving signal A to operate the light source (2). This driving signal A has a frequency, defined as the source frequency, which activates and deactivates the light source (2) in a cyclic pattern.

This signal generator (4) is also adapted to provide a driving or control signal D (with a frequency equal to or defined as the receiver frequency) to a shielding system, which is shown in this embodiment by a shutter (5). The driving signal D for the shutter (5) is used to periodically block the sensing of reflecting energy from a nearby target (6) and more distant target (7) by the camera (3).

The system (1) also incorporates a processing means, implemented in this embodiment through a micro-processor (8). The micro-processor (8) receives output signals from the camera (3) and processes a number of input signals to provide the range information or indications required from the system (1).

Figure 2A:
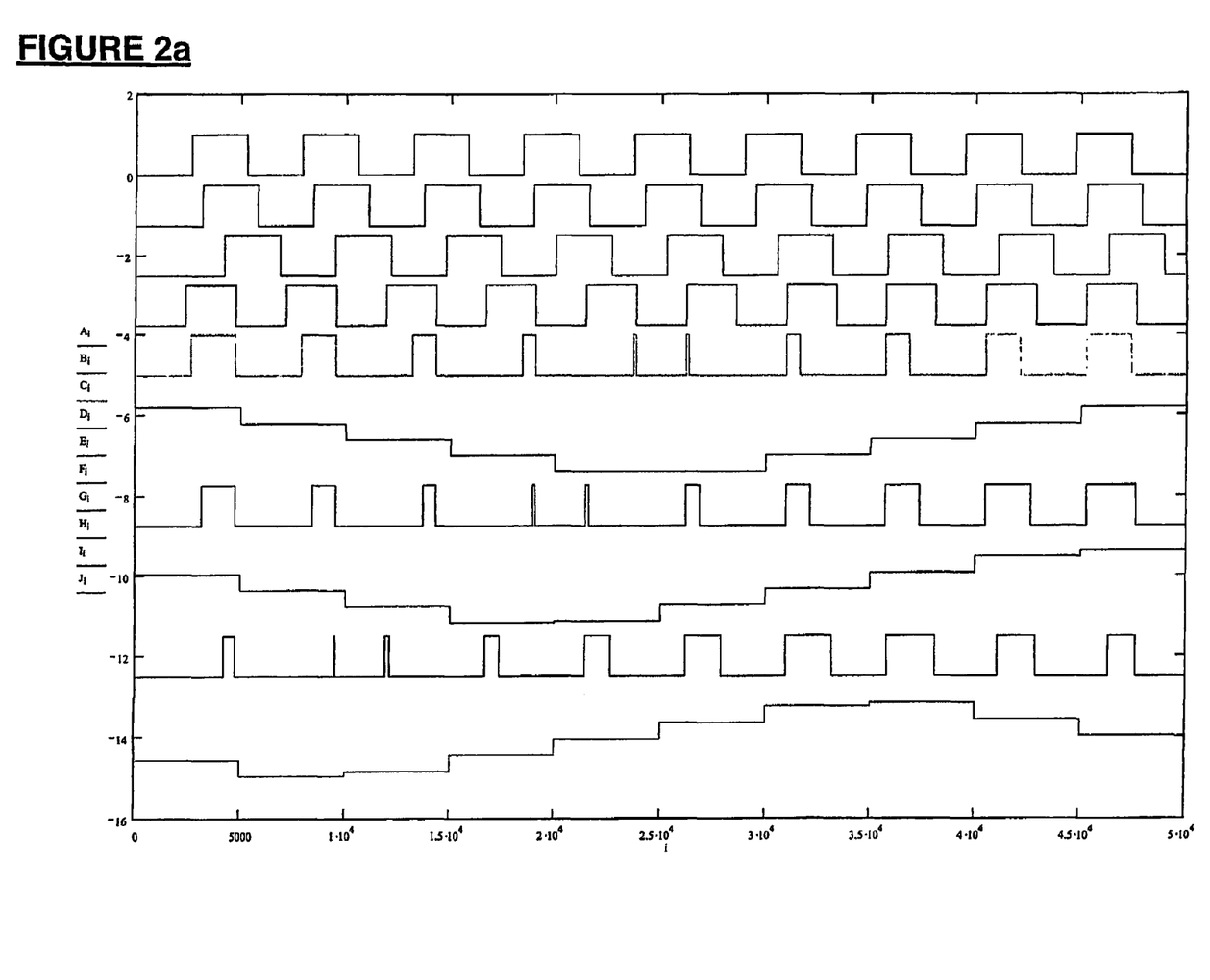
FIGS. 2a & 2b illustrate plots of wave functions for signals employed by or generated by the system discussed with respect to FIG. 1.
Figure 2B:
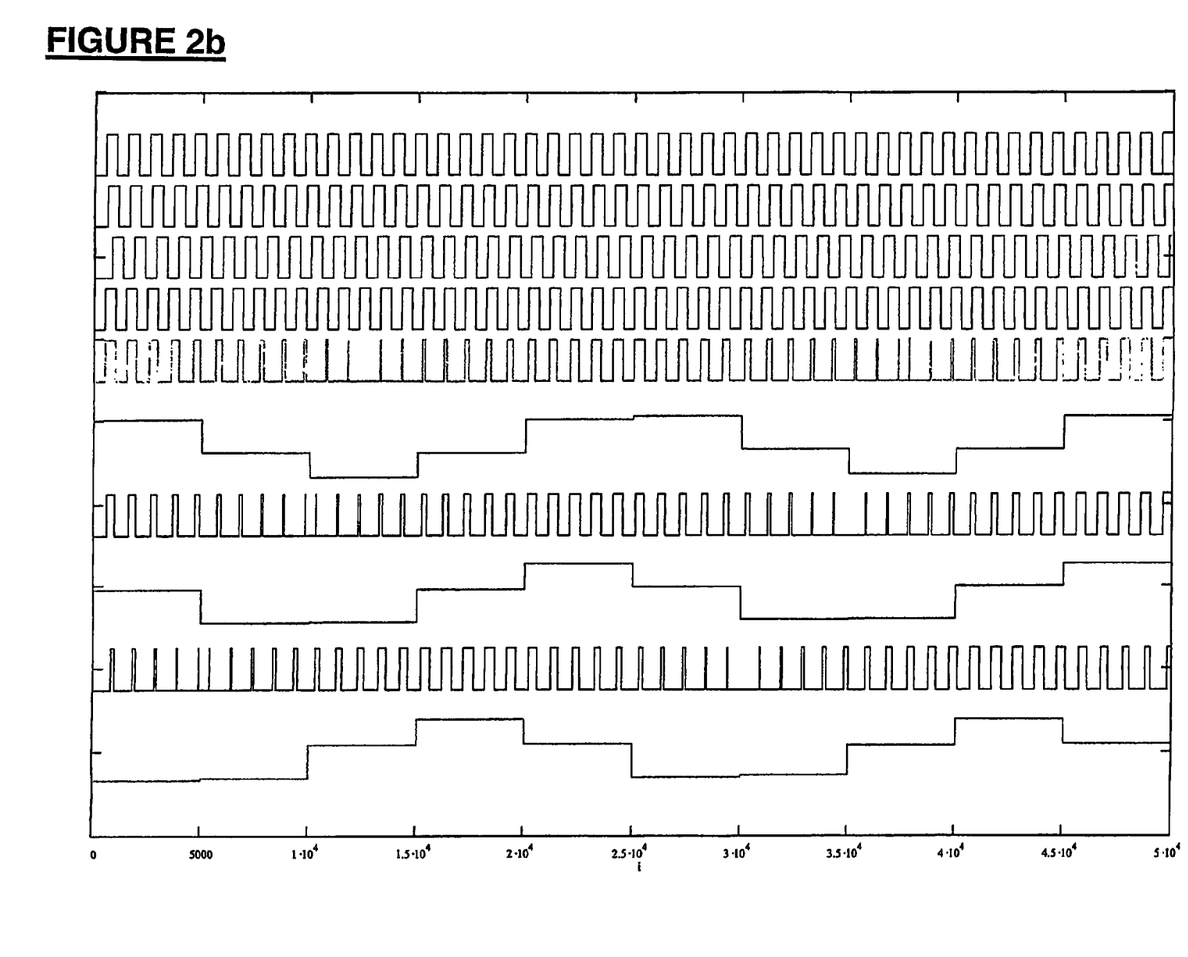

A number of specific electrical and also optical signals A-J are also employed or generated by the system shown. FIGS. 2a and 2b show plots of each of these signals with respect of time, where the amplitude and frequencies of the wave forms shown are given as approximations only to illustrate the behaviour of the system.

As discussed above, the signal generator (4) is used to generate a driving source frequency A and a driving receiver frequency D used to operate the light source (2) and shutter (5) respectively. The signal generator (4) is also adapted to provide phase-locking between these driving frequencies A, D so that a receiver frequency will be phase-locked with respect to the source frequency. The signal generator is also adapted to provide a third signal E which is the result of the receiver and source frequencies A, D mixed together to create an initial reference signal E.

Signal B shown represents the modulated light generated by the source (2) and reflected from a nearby target (6) towards the shutter (5). Conversely signal C represents the modulated light from the source (2) reflected from a more distant target (7) towards the shutter (5).

Signals G and represent a pair of mixed signals generated by the modulated light signals B, C being passed through the shutter (5) which is driven open and closed with a receiver frequency D. Signal G represents the mixed signal resulting from light reflected from a nearby target (6) (being B mixed with D) while signal represents the mixed signal resulting from light signal resulting from light reflected from the more distant target (being C mixed with D) (7).

These two optical signals and the further input reference signal E make up inputs to the camera (3) which acts as a transducer to produce electrical output signals H. J and F which are supplied to the micro-processor (8) as inputs. Output signal H is provided through a signal generated by light intersecting the camera which is reflected from the nearby target (6), while electrical signal J is provided through light intersecting the camera reflected from the more distant target (7). Electrical signal F is generated from the initial reference signal E and is used to provide a calibration or final reference signal in the calculation of range values by the micro-processor (8).

Because signals H and J are derived from light imaged on to the camera's sensor, each of these signals represent the intensity of the pixel of which the light is intersecting. Similarly, every other pixel on the camera's sensor will generate a similar waveform relating to the light reflected from the object(s) in that pixels field of view. The combination of waveforms from all of the camera's pixels will result in a time series of images, in which each pixel in the image contains one quantised time-slot of that pixels corresponding waveform.

The micro-processor (8) operates to compare or analyse phase differences between the reference signal F and the signals generated through the reflected light from each of the targets (6) and (7). The reference signal F is representative of light reflected from a target at a zero distance from the camera (3) so that the size of the phase difference between the reference signal F and signals H and J will indicate the range of the targets (6) and (7) from the camera (3).

Figure 3:
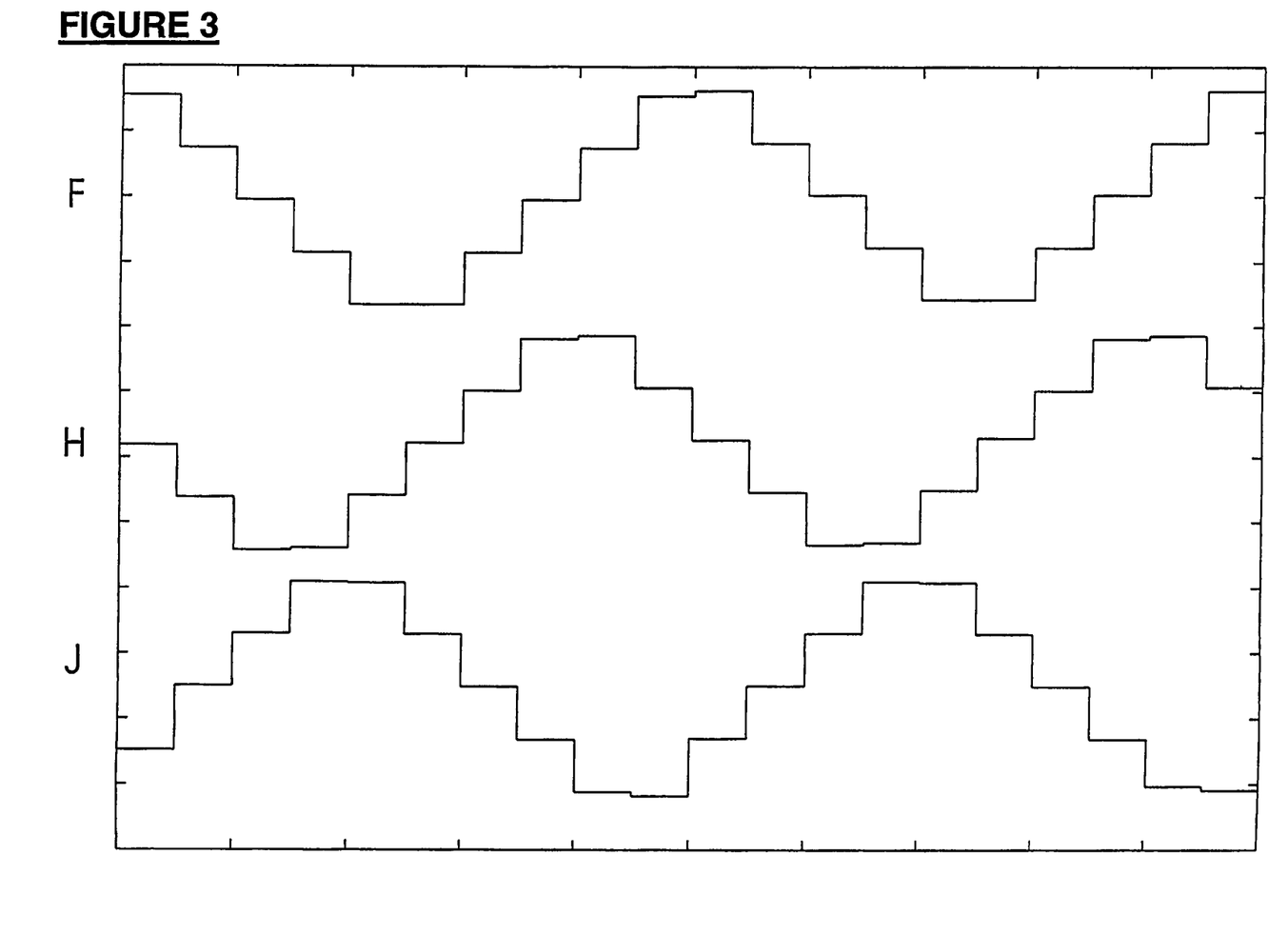
FIG. 3 illustrates plots of wave functions for signals employed by or generated by the system discussed with respect to FIG. 1.

FIG. 3 shows more clearly a comparison of signals F, J and H with respect to one another and as compared using the micro-processor A.

As can be seen from FIG. 3 the signal H has a lesser phase difference in the signal J from the reference signal F, thereby showing that target (7) is further from the camera (3) than target (6). The actual size of this phase difference is also calculated or analysed by the micro-processor (8) to assign a specific distance value to the targets (6, 7) and therefore provide range values.

Aspects of the present invention have been described by way of example only and it should be appreciated that modifications and additions may be made thereto without departing from the scope thereof as defined in the appended claims.

What we claim is:

1. A range sensing system comprising:
   at least one energy source adapted to emit energy capable of reflection by one or more targets within a region, and
   at least one receiver having a plurality of sensing elements configured to sense the reflection of emitted energy from a plurality of targets within said region, and
   an activation system associated with said at least one energy source, said activation system being adapted to activate and deactivate an energy source in a cycleic pattern with a selected source frequency, and
   a shielding system associated with said at least one receiver, said shielding system being configured to block the sensing of reflected energy from the plurality of targets by said at least one receiver, said shielding system being activated and deactivated in a cyclic pattern with a selected receiver frequency, said source frequency and receiver frequencies being selected from different frequency values, and
   wherein each sensing element of said at least one receiver generates an output signal with a frequency substantially equal to the frequency difference between said receiver frequency and said source frequency, and said output signal is compared with a reference signal to determine a range value for each of the sensing elements of said at least one receiver, where phase differences between said output signal and the said reference signal indicate a range value, and wherein the system indicates from the range values of the sensing elements a range value for each target of the plurality of targets sensed by the at least one receiver, substantially at the same time.

2. A range sensing system as claimed in claim 1 wherein the source frequency used is phase locked with respect to the receiver frequency used.

3. A range sensing system as claimed in claim 1 wherein a single signal generator generates a receiver frequency which is phase locked with respect to a source frequency generated by the same signal generator.

4. A range sensing system as claimed in claim 1 wherein said at least one energy source is activated and said at least one receiver is shielded using a plurality of paired source and receiver frequencies.

5. A range sensing system as claimed in claim 4 wherein said at least one receiver is adapted to emit a plurality of output signals in response to the use of said plurality of paired sets of source and received frequencies.

6. A range sensing system as claimed in claim 1 which includes a single energy source only with a diffuse emission pattern.

7. A range sensing system as claimed in claim 1 wherein an energy source is formed from a light emitting diode.

8. A range sensing system as claimed in claim 1 wherein an energy source emits visible light energy.

9. A range sensing system as claimed in claim 8 wherein a sensing element of the receiver is formed from a light sensitive transducer.

10. A range sensing system as claimed in claim 9 wherein the receiver is formed from or implemented by a charged coupled device.

11. A range sensing system as claimed in claim 1 wherein the range sensing system includes a single receiver having the plurality of sensing elements only.

12. A range sensing system as claimed in claim 1 wherein the activation system controls the supply of power to an energy source.

13. A range sensing system as claimed in claim 1 wherein the shielding system is implemented through a physical barrier.

14. A range sensing system as claimed in claim 1 wherein the shielding system is implemented through an enable signal applied to operate a receiver.

15. A range sensing system as claimed in claim 1 wherein the reference signal is generated by mixing the receiver frequency and the source frequency.

16. A range sensing system as claimed in claim 1 wherein the reference signal is generated through a calibration procedure.

17. A range sensing system as claimed in claim 1 wherein the range sensing system includes a processing means adapted to compare an output signal of the said at least one receiver to a reference signal.

18. A range sensing system as claimed in claim 17 wherein the processing means is a computer system.

19. A method of calculating range values for a plurality of targets within a region substantially at the same time, comprising:

(i) activating an energy source using an activation system, said energy source being activated and deactivated in a cyclic pattern with a selected source frequency, (ii) operating a receiver having a plurality of sensing elements configured to sense the reflection of emitted energy from at least one of said plurality of targets within said region, using a shielding system, said shielding system being configured to block the sensing of reflected energy from said plurality of targets in a cyclic pattern with a selected receiver frequency, said source frequency and receiver frequency being selected from different frequency values, and (iii) comparing an output signal of each sensing element of said at least one receiver having a frequency substantially equal to the frequency difference between said receiver frequency and said source frequency with a reference signal to determine a range value for each sensing element of said at least one receiver, where phase differences between said output signal and said reference signal indicate a range value, (iv) determining from the range values of the sensing elements a range value for each target of the plurality of targets sensed by the receiver, substantially at the same time.

20. A method of calculating a range to a target within a region as claimed in claim 19 wherein the energy source is activated and the receiver is shielded using a plurality of paired source and receiver frequencies.

* * * * *

UNITED STATES PATENT AND TRADEMARK OFFICE
CERTIFICATE OF CORRECTION

PATENT NO. : 7,391,505 B2
APPLICATION NO. : 10/552334
DATED : June 24, 2008
INVENTOR(S) : Adrian Andrew Dorrington It is certified that error appears in the above-identified patent and that said Letters Patent is hereby corrected as shown below:

Column 10, Line 17, please delete "cycleic" and insert --cyclic--

Signed and Sealed this

Nineteenth Day of August, 2008

JON W. DUDAS
*Director of the United States Patent and Trademark Office*